(12) United States Patent
Gashi

(10) Patent No.: US 12,269,084 B2
(45) Date of Patent: Apr. 8, 2025

(54) METHOD FOR MACHINING RIBS ON AIR OR GAS BEARINGS OF A COMPRESSOR

(71) Applicant: The Swatch Group Research and Development Ltd, Marin-Epagnier (CH)

(72) Inventor: Rexhep Gashi, Givisiez (CH)

(73) Assignee: THE SWATCH GROUP RESEARCH AND DEVELOPMENT LTD, Marin-Epagnier (CH)

( * ) Notice: Subject to any disclaimer, the term of this patent is extended or adjusted under 35 U.S.C. 154(b) by 0 days.

(21) Appl. No.: 17/935,313

(22) Filed: Sep. 26, 2022

(65) Prior Publication Data
US 2023/0150010 A1 May 18, 2023

(30) Foreign Application Priority Data
Nov. 16, 2021 (EP) .................................... 21208423

(51) Int. Cl.
*B23P 13/00* (2006.01)
*B21D 53/10* (2006.01)
*F16C 17/02* (2006.01)

(52) U.S. Cl.
CPC ............ *B21D 53/10* (2013.01); *F16C 17/024* (2013.01); *F16C 2360/44* (2013.01)

(58) Field of Classification Search
CPC .... B21D 53/10; F16C 17/024; F16C 2360/44; F16C 2206/40; F16C 2206/82;
(Continued)

(56) References Cited

U.S. PATENT DOCUMENTS

2011/0080673 A1* 4/2011 Aoshima ............... F16C 17/026
384/112
2013/0148918 A1 6/2013 Aoshima et al.
(Continued)

FOREIGN PATENT DOCUMENTS

DE 20 2021 101 195 U1 5/2021
EP 3 557 078 A1 10/2019
(Continued)

OTHER PUBLICATIONS

European Search Report Issued Apr. 29, 2022 in European Application 21208423.0 Filed on Nov. 16, 2021 (with English Translation of Categories of Cited Documents), 3 pages.
(Continued)

*Primary Examiner* — Jun S Yoo
(74) *Attorney, Agent, or Firm* — Oblon, McClelland, Maier & Neustadt, L.L.P.

(57) ABSTRACT

A method for machining ribs or grooves on a workpiece such as a shaft or an air or gas axial bearing intended to be rotated about a longitudinal axis of a centrifugal compressor. All of the ribs or grooves are obtained at once by the machining tool on a workpiece portion driven such that it rotates, by moving the workpiece or the tool holder in a longitudinal machining direction, the machining tool moving back and forth with a machining position in contact with the workpiece and a position wherein it is not in contact with the workpiece from the start to the end of the workpiece portion. The back-and-forth movements of the machining tool are synchronised with the sinusoidal program set up in the machining unit, as well as with the desired, programmed arrangement of the ribs or grooves to be produced on the workpiece portion.

9 Claims, 4 Drawing Sheets

(58) Field of Classification Search
CPC .............. F16C 2220/62; F16C 2300/22; F16C 17/026; F16C 17/045; F16C 17/107; F16C 33/1015; F16C 33/14; F16C 32/0603; F16C 32/0681; F16C 32/0685; G05B 2219/45214; G05B 19/186; B23B 5/48; B23B 2220/12; B23B 2222/28; B23B 2226/18; B23B 2226/31; B23B 5/36; B23B 1/00; B23B 29/125; F04D 17/12; F04D 29/023; F04D 29/057; F04D 29/053; F05D 2230/10; F05D 2250/294

See application file for complete search history.

(56) References Cited

U.S. PATENT DOCUMENTS

2013/0235489 A1* 9/2013 Aoshima ............. F16C 32/0666
 384/123
2014/0259642 A1 9/2014 Aoshima
2019/0323509 A1* 10/2019 Gashi .................... F04D 17/122

FOREIGN PATENT DOCUMENTS

| JP | 6-254701 A | 9/1994 |
| JP | 10-328902 A | 12/1998 |
| JP | 2002-36004 A | 2/2002 |
| JP | 2002-219603 A | 8/2002 |
| JP | 2013-185658 A | 9/2013 |
| JP | 2019-190457 A | 10/2019 |
| WO | WO 01/01003 A1 | 1/2001 |

OTHER PUBLICATIONS

Office Action issued Dec. 5, 2023, in corresponding Japanese Patent Application No. 2022-166093 (with English Translation), 10 pages.

* cited by examiner

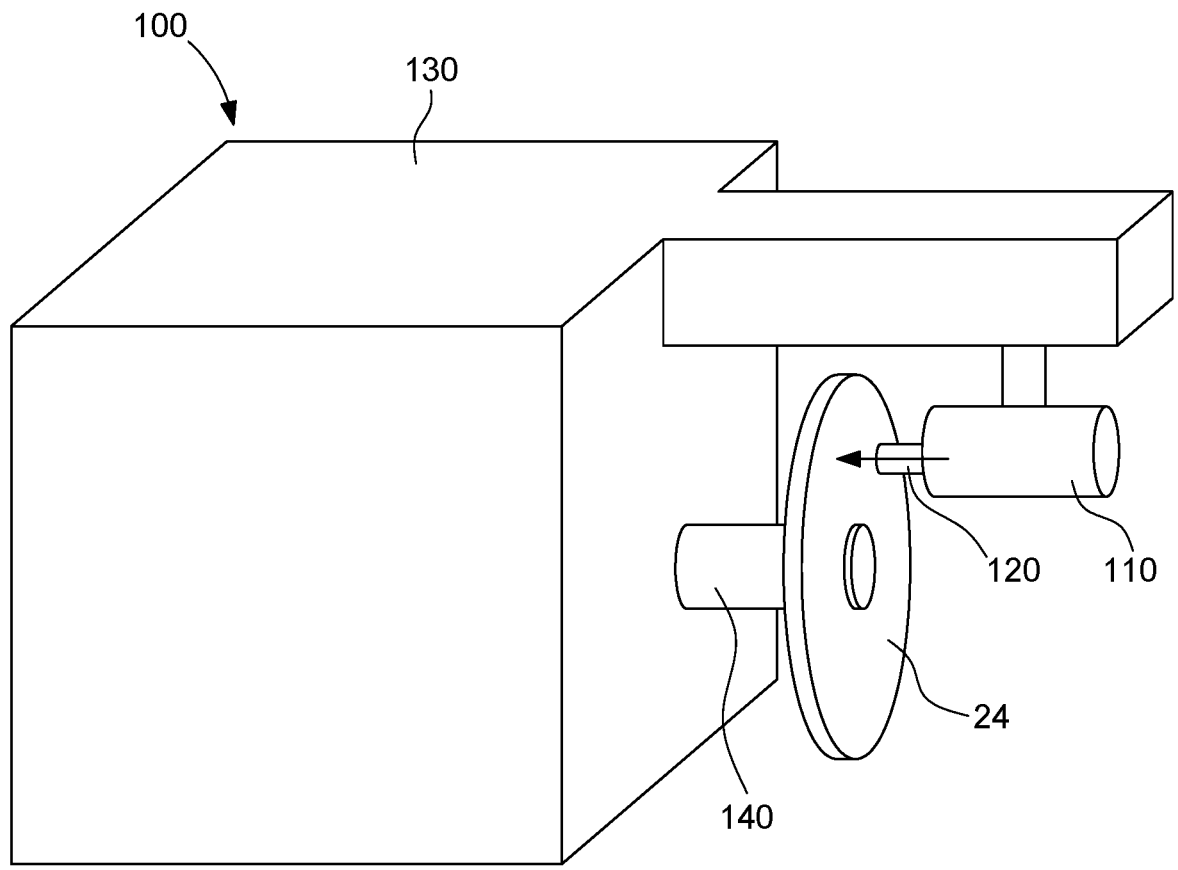

METHOD FOR MACHINING RIBS ON AIR OR GAS BEARINGS OF A COMPRESSOR

CROSS-REFERENCE TO RELATED APPLICATION

This application claims priority to European Patent Application No. 21208423.0, filed on Nov. 16, 2021, the entire disclosure of which is hereby incorporated herein by reference.

FIELD OF THE INVENTION

The invention relates to a method for machining ribs or grooves on air or gas bearings of a high-speed centrifugal fluid compressor. The compressor is a two-stage compressor, and comprises a casing with a fluid inlet and a compressed fluid outlet and encloses a shaft mounted such that it rotates about a longitudinal axis. A first impeller and a second impeller are mounted back-to-back on the shaft, the first impeller constituting a first compression stage and the second impeller constituting a second compression stage. The centrifugal compressor further comprises a motor, preferably a synchronous electric motor, positioned between the first impeller and the second impeller and arranged to rotate the shaft. At least one air or gas axial bearing is mounted at one end of the shaft, and a front air or gas radial bearing is mounted on a first end of the shaft and a rear air or gas radial bearing is mounted on a second end of the shaft.

BACKGROUND OF THE INVENTION

Fluid compressors are generally referred to as turbochargers or centrifugal compressors. They comprise a stator and a rotor forming a permanent magnet synchronous motor (brushless motor). They can reach very high speeds, such as 100,000 to 500,000 revolutions/minute. The motor drives the impellers at a high speed, the impellers compressing the fluid. The fluid can be air, a gas, a coolant or any other suitable fluid. The use of two impellers allows the fluid to be compressed twice as much.

These compressors can be used, for example, in a mobile HVAC (heating, ventilation and air conditioning) system with a refrigerant gas such as in electric, hybrid or hydrogen vehicles. These compressors can also be used in a stationary system with a refrigerant gas such as a heat pump.

These compressors generally comprise a first circuit for circulating the fluid to be compressed and a second circuit for circulating a cooling liquid used to cool the compressor, and more particularly the motor and the air or gas bearings supporting the shaft of the motor on the one hand and the electronic components on the other hand. More specifically, the high-speed rotation of the motor leads to very significant heat generation, so much so that the elements of the compressor must be cooled to prevent damage thereto. These circuits are typically provided outside the compressor itself, at least as regards the cooling circuit. There is no provision to facilitate the flow of the cooling gas or air during the operation of the compressor, in particular at high speeds, which constitutes a drawback. Moreover, the air or gas bearings supporting the rotor shaft are not designed to support the rotor shaft without friction, which leads to significant heat generation when the rotor is rotating at a high speed, which constitutes another drawback.

Moreover, grooves or ribs are known to be made on the air or gas bearings for air or gas flow, and to create pressure and cooling. However, the grooves are produced without any specific arrangement by laser machining, which constitutes a drawback because the machining time is too long and thus the costs thereof are too high.

SUMMARY OF THE INVENTION

One purpose of the invention is to overcome the various drawbacks mentioned hereinabove by means of a method for rapidly producing grooves or ribs on a rotor shaft at each air or gas radial bearing, and on an air or gas axial bearing attached to the shaft. Said grooves in the shaft are arranged in such a way as to overcome gravity when the shaft of the compressor rotates at high speed in each bearing and to allow the rotating rotor shaft to be held without mechanical contact on an air or gas current in the radial bearings and thus virtually frictionlessly.

To this end, the present invention relates to a method for machining ribs or grooves on air or gas bearings of a high-speed fluid compressor, which comprises the features of the independent claim 1.

Specific steps of the method are defined in the dependent claims 2 to 11.

One advantage of the method for machining ribs or grooves on a workpiece of the compressor in a machining unit is that all the ribs or grooves are obtained at once on a workpiece portion driven in rotation, by a machining tool which moves back and forth from the start to the end of the workpiece portion. To do this, the back-and-forth movements of the machining tool are synchronised with the sinusoidal program set up in the machining unit, as well as with the desired arrangement of the ribs or grooves to be produced on the workpiece portion.

During the machining of the workpiece, the workpiece or the tool holder carrying the machining tool is also displaced in a longitudinal machining direction while the machining tool carries out the back-and-forth movements.

The back-and-forth movements of the tool are compared to a piezoelectric oscillator where the oscillation frequency can be varied to speed up or slow down the back-and-forth movements of the tool according to how the machining unit was programmed to obtain said desired ribs or grooves. During the back-and-forth movements, the tool is in the machining position and in contact with the workpiece at one time and not in contact with the workpiece at another time.

The workpiece is a shaft attached to a rotor structure of an electric motor driving it in rotation, or at least one air or gas axial bearing mounted at a first end of the shaft between an impeller and an air or gas radial bearing. Ribs or grooves can be produced on one face or preferably on both faces of the disc of the air or gas axial bearing.

One advantage of the method for machining ribs or grooves in a machining unit is that the ribs or grooves are produced very quickly in less than 1 minute on each workpiece portion of the shaft for the air or gas radial bearings and with great precision. The same applies to the grooves or ribs produced on one or both faces of the disc of the air or gas axial bearing driven in rotation. The machining tool is harder than the material of the shaft or of the air or gas axial bearing.

As explained hereinabove, the machining unit can be programmed for simultaneous synchronised rotation with the machining tool according to a sinusoidal program to obtain a rib or groove arrangement on each workpiece portion of the shaft for each air or gas radial bearing, and for the air or gas axial bearing.

As a result of such a machining of the ribs or grooves, which are preferably V-shaped with a change of orientation of each rib or groove in the centre of each machined portion on the shaft, the shaft rotating at high speed can be held in the compressor in the air or gas radial bearings without mechanical contact. The shaft is thus held in each radial bearing with virtually no friction by the pressure of the air or gas passing within the grooves or ribs as a result of the high-speed rotation of the shaft. From as low as 6,000 rpm, the air or gas pressure in each aerodynamic radial bearing is such that the shaft is no longer in mechanical contact with the static radial bearing, thus avoiding any mechanical friction. It goes without saying that the faster the shaft rotates, the greater the air pressure in the radial bearing, which automatically generates more air or gas friction.

The grooves or ribs are machined by the machining unit and the machining tool according to a sinusoidal program and the desired arrangement of the grooves or ribs, so as to reverse the orientation of the grooves or ribs on the shaft that is substantially towards the inner half of each static radial bearing placed above said ribs. This generates an air or gas pressure, which can become greater and greater the faster the shaft rotates.

Such a high-speed centrifugal fluid compressor can rotate at very high speeds without excessive heating due to the production of the ribs or grooves on the air or gas radial bearings.

A axial bearing is also provided between the first impeller and the first radial bearing. Grooves or ribs are made at the periphery in the form of spirals on a front face and a rear face of the disc of the axial bearing. Air films are generated by the grooves as the shaft rotates to hold the shaft in a longitudinally well-centred position.

BRIEF DESCRIPTION OF THE FIGURES

The purposes, advantages and features of the present invention will be better understood upon reading the following detailed description of one embodiment of the invention, which is given as a non-limiting example and illustrated in the accompanying drawings, in which:

FIG. 9 is a three-dimensional overview of a machining unit for machining the grooves or ribs on an air or gas axial bearing of the centrifugal compressor according to the invention.

DETAILED DESCRIPTION OF THE INVENTION

In the present description, all the components forming part of the centrifugal compressor, which are well known in the prior art, are only briefly described herein, as the invention essentially relates to the manner in which ribs or grooves are produced on two portions of a shaft in order to be covered by two static air or gas radial bearings respectively, or on an air or gas axial bearing.

Figure 1:
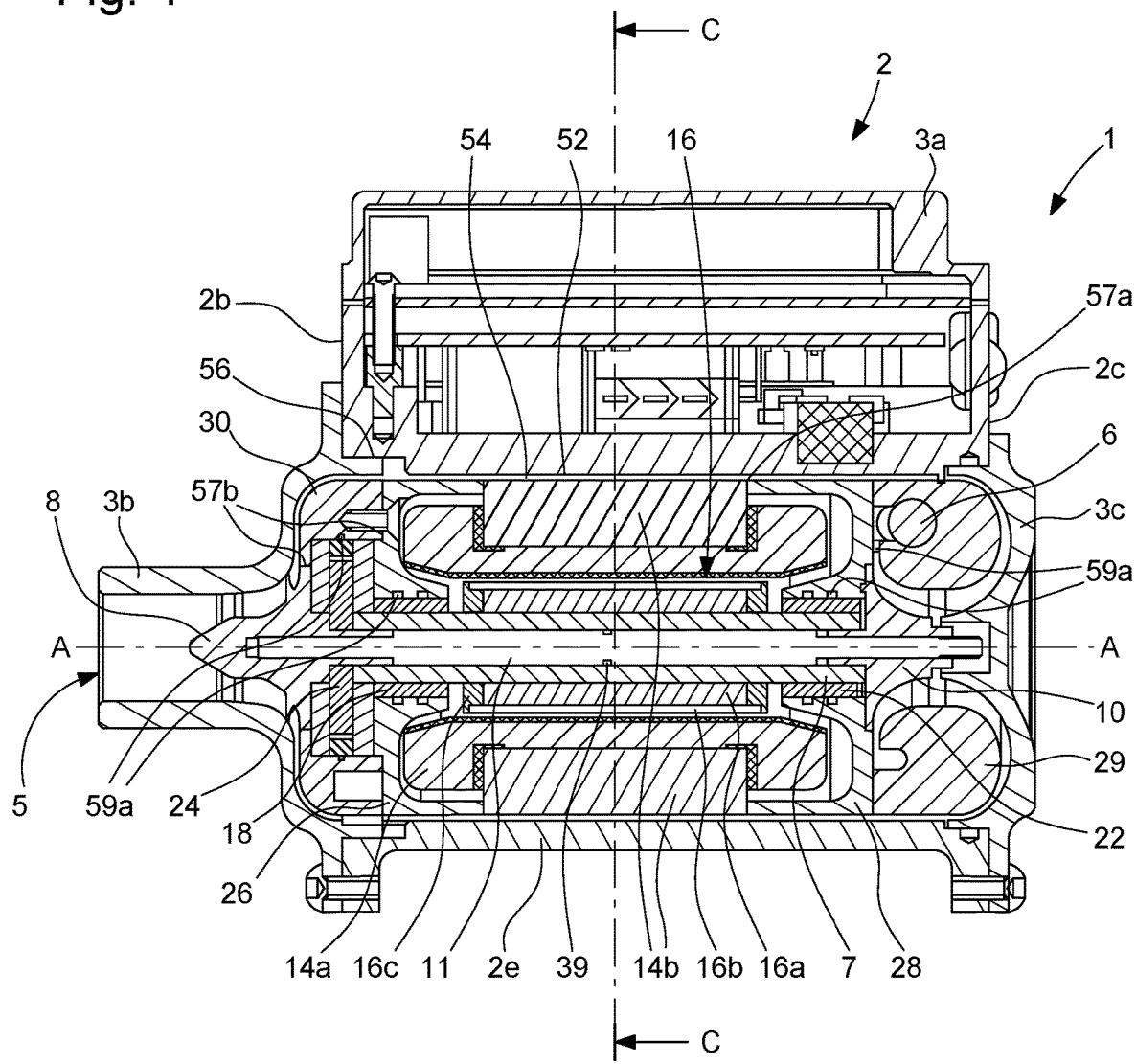
FIG. 1 shows a longitudinal sectional view along the axis A-A of a high-speed centrifugal compressor according to the invention.

FIG. 1 shows a cross-section along the longitudinal axis A-A of a high-speed centrifugal converter 1. The centrifugal converter comprises, in a casing 2, a shaft 7 made of tungsten carbide or ceramic, mounted such that it rotates about a longitudinal axis A-A passing through the front face 2b and rear face 2c, a first centrifugal impeller 8 and a second centrifugal impeller 10 mounted back-to-back at each end of the shaft 7, said first impeller 8 constituting a first compression stage and said second impeller 10 constituting a second compression stage. In particular, the shaft 7 is hollow in this embodiment and encloses a threaded rod 11, to each end whereof one of the impellers 8, 10 is screwed, enabling the impellers to be easily mounted and removed. Thus, the two impellers 8 and 10 are driven on the same shaft 7, which improves the energy efficiency and avoids the need for a gear box. The rear of the impellers 8 and 10 includes a labyrinth seal to control the pressures in the compressor and balance the axial forces.

The casing 2 further encloses an electric motor that is preferably synchronous, positioned between the first impeller 8 and the second impeller 10 and arranged to rotate the shaft 7. The motor comprises a stator 14 and a rotor structure 16 which interact with one another to form a synchronous electric motor with at least one permanent magnet 16a (brushless motor). More particularly, the stator 14 is formed by a coil 14a and two ferrite elements 14b, mounted such that they are fixed relative to the casing 2. The rotor structure 16 comprises one or more permanent magnets 16a made integral with the shaft 7, for example by bonding, and is covered by a titanium lining 16b. Titanium flanges 16c are attached (for example by bonding) to the lateral ends of the lining and ensure that the rotor is resistant to the centrifugal forces at high speeds.

The shaft 7 is mounted such that it can rotate in the casing 2 about the longitudinal axis A-A thereof by means of at least one front radial bearing 18, one rear radial bearing 22 and one axial bearing 24. The centrifugal compressor 1 comprises a front radial bearing bracket 26 for carrying the front radial bearing 18, and a rear radial bearing bracket 28 for carrying the rear radial bearing 22, arranged to be positioned around the shaft 7, respectively at the front and rear of the motor. At the rear, a volute 29 is also provided between the rear radial bearing bracket 28 and the rear cover 3c. The volute 29 comprises the orifice leading to the tangential fluid outlet 6, after compression. A axial bearing bracket 30 is also provided to carry the axial bearing 24, arranged to be positioned around the shaft 7, between the first impeller 8 and the front radial bearing bracket 26. It is clear that the axial bearing could be provided at the rear of the motor.

The bearings are non-contact, aerodynamic type bearings, in order to generate little friction. They require no lubrication and very little maintenance. More particularly, with reference to FIGS. 2a, 2b and 3, the axial bearing 24 is an aerodynamic bearing and is constituted by a disc including, on at least one of the faces thereof, first grooves 24a, preferably spiral-shaped over an annular area at the periphery, arranged to create an air film. Preferably, the axial bearing 24 comprises preferably spiral-shaped grooves or ribs 24a at the periphery of the disc of the axial bearing 24 on a front face and on a rear face, obtained by a machining process explained hereinbelow. The orientation of the grooves or ribs 24a can be different on the front face to that on the rear face or can be identical. The axial bearing 24 with its grooves or ribs 24a keeps the rotating shaft 7 longitudinally centred by generating air films from the front face and rear face. The front radial bearing 18 and the rear radial bearing 22 are aerodynamic bearings, and the shaft 7 has, facing the front 18 and rear 22 radial bearings, second grooves or ribs 32 arranged to create an air or gas film when the shaft is rotated in the air or gas radial bearings.

Figure 2A:
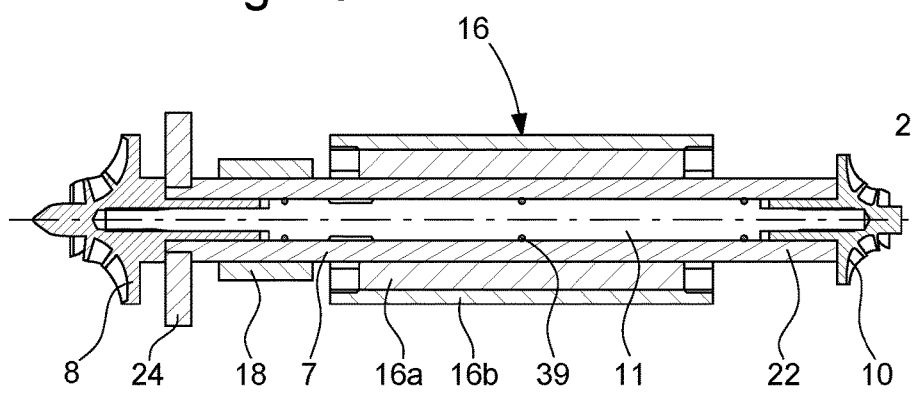
FIGS. 2a and 2b show a longitudinal sectional view along the axis A-A of the shaft with the impellers, the aerodynamic axial and radial bearings and the permanent-magnet rotor structure according to the invention, and a plan view from the side of the first impeller and the axial bearing according to the invention.
Figure 2B:
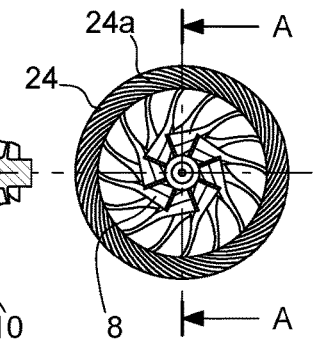
Figure 3:
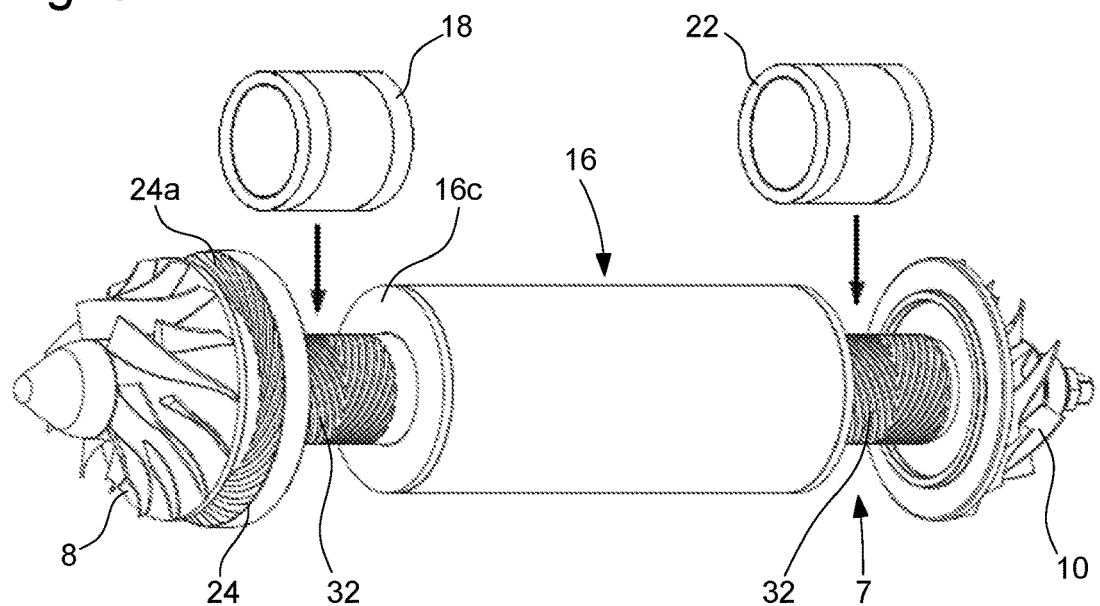
FIG. 3 is a three-dimensional view of the assembly in FIG. 2 showing the grooves or ribs in each static radial bearing shown raised above the shaft according to the invention.

In FIGS. 2a, 2b and 3, the first centrifugal impeller 8 and the second centrifugal impeller 10 can still be seen mounted back-to-back at each end of the shaft 7. At the two ends of the shaft 7, there is a first portion of machined ribs or grooves 32 and at the other end a second portion of machined ribs or grooves 32. The rotor structure 16 with at least one permanent magnet 16a is fixed on the shaft in a central position for the electric motor.

Figure 4:
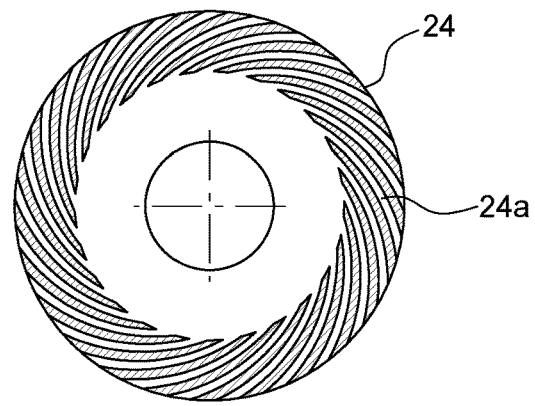
FIG. 4 is a plan view of the air or gas axial bearing.

FIG. 4 shows an embodiment of the air or gas axial bearing 24. As can be seen in this FIG. 4 in plan view, ribs or grooves 24a of a certain depth are produced on an annular area starting from the periphery of the disc and leading towards the centre of the disc. The ribs or grooves 24a and the arrangement thereof are programmed, in particular in the machining unit, to activate the machining tool so as to produce all of the ribs or grooves at once, i.e. by moving the tool holder, or the rotating disc in a single machining direction, for example from the periphery of the disc to the bottom of the annular area of the ribs or grooves. Starting, for example, from the periphery of the disc on one face, groove portions are gradually formed by back-and-forth movements of the machining tool in synchronism with the machining unit rotating the disc at a given speed according to a sinusoidal program.

With this program and in combination with the controlled back-and-forth movements of the machining tool, the start of all of the grooves 24a is achieved by the rotation of the disc and the back-and-forth movements of the machining tool. This is continuously repeated for the following groove or rib portions continuously from the first groove portion to the end or to the bottom of the annular area. With such a way of producing the different ribs or grooves 24a on the disc 24, the machining time per grooved face of the disc is less than one minute, which is significantly different from a previous machining technique using a laser beam.

Figure 5:
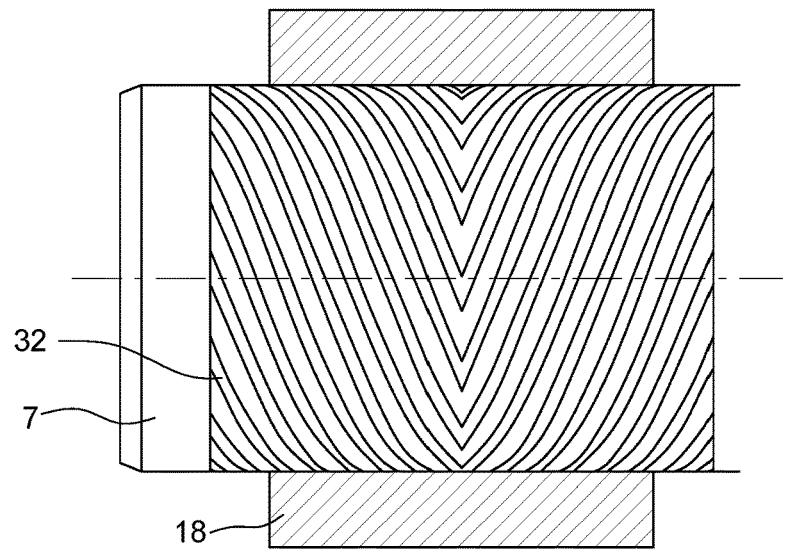
FIG. 5 is a view of the ribs or grooves disposed at one end of the shaft on which is disposed the static radial bearing shown via a longitudinal section according to the invention.

FIG. 5 shows a first portion of ribs or grooves 32 produced on a first end of the shaft 7 with a first air or gas radial bearing 18 shown via a longitudinal section on the first portion of ribs or grooves 32 produced by the machining method.

As with the production of the grooves or ribs on the axial disc described hereinabove, during the machining of these grooves or ribs 32, the shaft 7 is rotated by the machining unit about the longitudinal axis thereof and moved along the longitudinal axis thereof in a machining direction. The machining tool disposed in its tool holder is moved back-and-forth opposite the first portion of the shaft to be machined at a frequency that depends on how the machining unit was programmed. It should be noted that instead of moving the shaft 7 in a longitudinal direction, the tool holder could be moved in the longitudinal machining direction. All of the ribs or grooves 32 are obtained at once by the machining tool on the first workpiece portion of the first end of the shaft driven in rotation, said machining tool carrying out back-and-forth movements from the start to the end of the first workpiece portion of the shaft 7.

The machining unit is programmed to have a simultaneous synchronised rotation of the shaft 7 with the machining tool according to a sinusoidal program to obtain a determined arrangement of the ribs or grooves 32 on the first workpiece portion of the shaft 7 for the front air or gas radial bearing 18. Starting, for example, from the start of the first workpiece portion of the shaft 7 on the same side as the first end thereof and in one machining direction only, and as far as the end of the first portion of the first end of the shaft 7, all of the ribs or grooves 32 are machined at once, which significantly reduces the machining time.

The specific arrangement of the ribs or grooves 32 produced on the first portion of the first end of the shaft 7 is programmed in the machining unit. In one desired embodiment, the ribs or grooves 32 are each V-shaped, i.e. they include a change of orientation in principle from the middle of the first workpiece portion of the shaft 7. This ensures that the shaft rotating at high speed in the compressor is held without mechanical contact in the air or gas radial bearings. From as low as 6,000 rpm, the air or gas pressure in each aerodynamic radial bearing is such that the shaft is no longer in mechanical contact with the static radial bearing, thus avoiding any mechanical friction.

Figure 6:
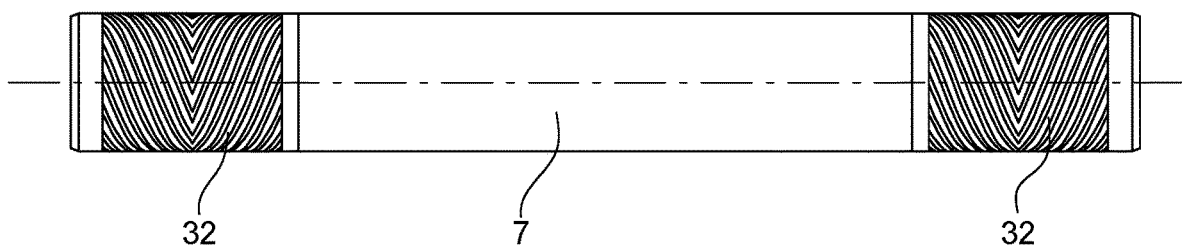
FIG. 6 is a view of the shaft with grooves or ribs disposed at the two ends of the shaft and on which are respectively disposed the static air or gas radial bearings according to the invention.

FIG. 6 shows the shaft 7 with a first portion containing machined ribs or grooves 32 on the first end of the shaft and a second portion on the second end of the shaft 7. The first portion and the second portion are machined in the same way as described hereinabove with reference to FIG. 5. The same arrangement of V-shaped ribs or grooves 32 at the two ends of the shaft 7 can be provided.

As a supplement to FIG. 1, the compressor 1 comprises a casing 2, made of aluminium, the top face 2a whereof is closed by a top cover 3a and the front face 2b and rear face 2c whereof are closed by a front cover 3b and a rear cover 3c respectively. The side faces 2d of the casing are joined at their base to form a bottom 2e with a U-shaped cross-section.

The top cover 3a is positioned on the same side as the electronic components of the compressor. Thus, access to the electronic components integrated in the compressor is easy, which access is provided through the top cover 3a. The front and rear covers 3b, 3c are used to reach the interior of the compressor (motor, rotor, bearings, etc.). A gasket is interposed between the top face of the casing 2 and the top cover 3a. This gasket protects the electronic components from dust and moisture.

The casing 2 has an inlet 5 for the fluid to be compressed provided on the front cover 3b and a tangential outlet 6 for the compressed fluid provided on one of the side faces of the casing 2.

In FIG. 1, the casing 2 comprises an inner housing extending coaxially to the longitudinal axis A-A from end to end between the front face 2b and the rear face 2c of the casing 2 and receiving the front radial bearing bracket 26 and the front radial bearing 18, the motor and the rotor structure 16 thereof attached to the shaft 7, the rear radial bearing bracket 28 and the rear radial bearing 22, the second impeller 10 and the volute 29. On the front face 2b side, the inner housing is closed by the front cover 3b which integrates the first impeller 8, the axial bearing bracket 30 and the axial bearing 24. On the rear face 2c side, the inner housing is closed by the rear cover 3c.

Moreover, at least one orifice is advantageously provided, for example the point given the reference 57a, arranged to allow the fluid to be compressed circulating within the channels to enter the motor and circulate between the stator 14 and the rotor structure 16, and at least one orifice, for example the points given the reference 57b, arranged to allow the fluid to be compressed to exit the motor and rejoin said channels after having cooled the motor.

Similarly, at least one orifice is advantageously provided, for example the points given the reference 59a in FIG. 1, arranged to allow the fluid to be compressed circulating within the channels 54 to circulate in the vicinity of the axial bearing 24, the front radial bearing 18 and the rear radial bearing 22, and at least one orifice corresponding, for example, to the same points given the reference 57b, arranged to allow the fluid to be compressed to rejoin said channels 54 after having cooled said axial bearing 24, front radial bearing 18 and rear radial bearing 22.

Thus, after entering the first compression stage through the inlet 5, the fluid to be compressed passes in the channels 54 through the parts of the compressor located along the longitudinal axis between the first compression stage and the second compression stage to rejoin the second compression stage. As a result, the fluid to be compressed, as it passes between the inner wall 52 and the ferrite elements 14b of the motor, cools the latter and recovers lost heat from the motor to increase the efficiency thereof before entering the second compression stage. Moreover, the orifices 57a, 57b, 59a allow for a slight deviation of the flow so that the fluid to be compressed also circulates between the stator 14 and the rotor structure 16 and in the bearings in order to cool these elements and recover the heat losses from the motor and the heat losses due to friction in the bearings.

The centrifugal compressor 1 allows very high rotational speeds to be reached, lying in the range 100,000 rpm to 500,000 rpm. It allows the fluid compressed in the first compression stage to pass substantially through the entire system to recover any waste heat, and in particular waste heat from the motor, bearings and electronic components, in order to increase the efficiency thereof before entering the second compression stage (as the temperature of the fluid to be compressed increases, so does the pressure thereof). Moreover, the use of the only fluid to be compressed to cool the compressor, without the aid of an additional cooling circuit, as well as the arrangement of the electronic components in the compressor for the electronics to be integrated into the casing, results in a very compact compressor. The compressor according to the invention thus has a high rotational speed and a high compression ratio while occupying a small volume. For example, a compressor according to the invention has a compression ratio greater than 3, and a power of the order of 4 kW for dimensions L×W×H in cm of the order of 14×8×11 for a weight of only 1.6 kg.

For example, the compressor according to the invention can be used with air or gas to power fuel cells, or any other system that uses compressed air (industrial compressors, medical compressors, ships, etc.).

With a refrigerant gas, the compressor according to the invention can be used in a mobile HVAC (heating, ventilation and air conditioning) system, such as in electric, hybrid or hydrogen vehicles.

The centrifugal compressor can also be used in a stationary system with a refrigerant gas such as a heat pump.

The centrifugal compressor can also be used with a natural gas.

Figure 7:
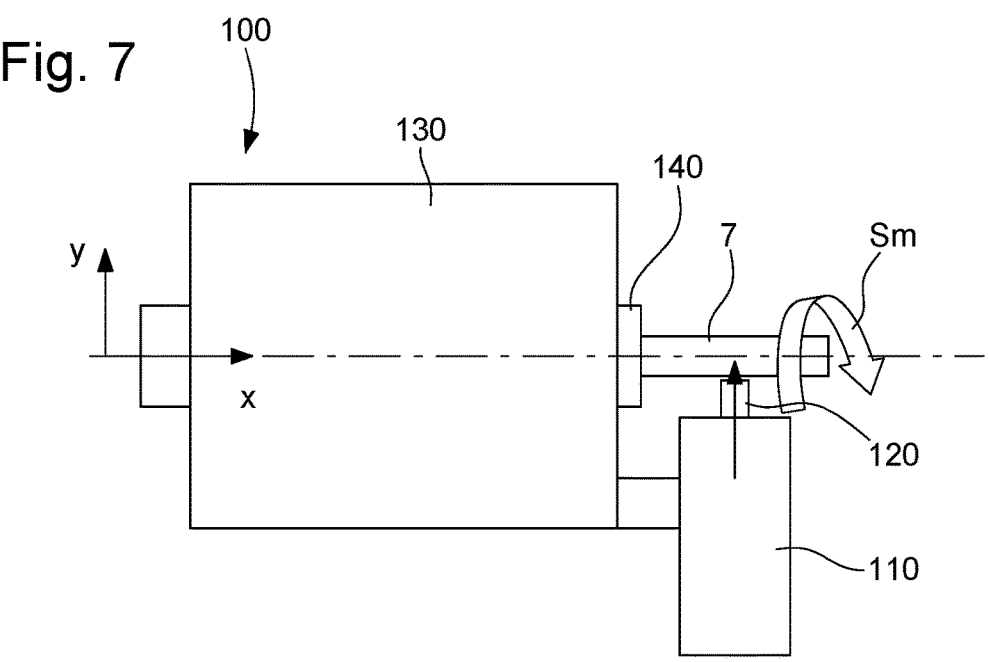
FIG. 7 is an overview of a machining unit for machining the grooves or ribs on the shaft of the centrifugal compressor according to the invention.

FIG. 7 shows an overview of the machining unit 100 for producing ribs or grooves on portions of the first end and the second end of the shaft.

The machining unit 100 comprises a lathe 130 with a spindle 140 for holding the shaft 7 and rotating it when machining the ribs or grooves. According to an alternative embodiment, the spindle that holds the shaft in rotation can move in a longitudinal machining direction to produce the ribs or grooves as shown by the arrow Sm.

The machining unit 100 further comprises a tool holder 110 connected to the structure of the lathe 130. The tool holder 110 carries a machining tool 120, the machining head whereof, which comes into contact with the shaft to machine the grooves or ribs, can be moved back and forth according to how the machining unit is programmed. The head of the machining tool 120 can be made of diamond for machining the ribs or grooves on the shaft 7 made of tungsten carbide or ceramic. This is carried out so as to have a simultaneous synchronised rotation of the shaft 7 with the machining tool according to a sinusoidal program to obtain a determined arrangement of the ribs or grooves on the workpiece portions of the shaft 7 for each front or rear air or gas radial bearing.

In an alternative embodiment, the tool holder 110 can also be moved in a longitudinal machining direction instead of the shaft 7 for machining the ribs or grooves on the shaft.

The frequency of the back-and-forth movements of the tool can also be changed according to how the machining unit 100 is programmed.

Figure 8:
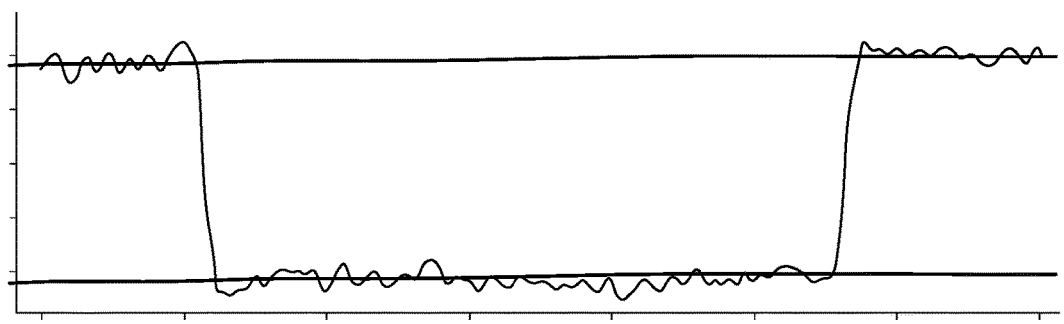
FIG. 8 is a graph of a precision rib produced on the shaft for the air or gas radial bearings according to the invention.

FIG. 8 shows a precision rib or groove for air or gas bearings obtained by the back-and-forth movements of the machining tool, which is determined by the material to be machined, the speed of rotation of the shaft for the machining operation, the diameter of the shaft and many other parameters.

Finally, FIG. 9 shows a machining unit 100 for producing ribs or grooves on one or two faces of the disc of the air or gas axial bearing 24. This machining unit 100 comprises the same elements as those described with reference to FIG. 7 and will not be repeated with reference to this FIG. 9. Only the manner in which the tool holder 110 is connected to the structure of the lathe 130 should be noted.

It goes without saying that the present invention is not limited to the examples shown and that various alternatives and modifications that may be clearly apparent to a person skilled in the art can be made thereto. Other combinations are of course possible with what is already known with centrifugal compressors. Fast and precise machining of ribs or grooves can be carried out on other workpieces than those described hereinabove with equivalent machining elements.

The invention claimed is:

1. A method for machining ribs or grooves on a workpiece intended to be rotated about a longitudinal axis of a centrifugal compressor, the workpiece being a shaft made of tungsten carbide or ceramic, on which a rotor structure with at least one permanent magnet of an electric motor is attached in order to drive the shaft such that the shaft rotates, the centrifugal compressor further comprising a casing with a fluid inlet and a compressed fluid outlet, a first impeller and a second impeller mounted at two ends of the shaft in the casing, a front air or gas radial bearing mounted on a first end of the shaft, and a rear air or gas radial bearing mounted on a second end of the shaft, the machining method being carried out in a machining unit adapted to receive the workpiece and comprising a tool holder with a tool for machining the ribs or grooves on at least one portion of the workpiece, wherein all of the ribs or grooves formed on a workpiece portion of the shaft are obtained at once by driving the workpiece such that it rotates by moving the workpiece or the tool holder in a machining direction for extending the grooves via the machining unit, and by moving said machining tool moving back and forth between a machining position in contact with the workpiece and a position wherein it is not in contact with the workpiece from the start to the end of the machining, and wherein, in accordance with a sinusoidal program, the machining unit rotates the workpiece to repeat forward and reverse rotations by continuously and sinusoidally changing the rotation angle of the workpiece while at least synchronising the rotation of the workpiece with the back-and-forth movements of the machining tool so that a determined arrangement of the ribs or grooves are produced on the shaft.

2. The machining method according to claim 1, wherein the workpiece is the shaft and a head of the machining tool is made of diamond, wherein the shaft is driven such that it rotates during machining about the longitudinal axis, in that all of the ribs or grooves are obtained at once on a first workpiece portion of the first end of the shaft from the start portion of machining of the first workpiece portion to the end portion of machining of the first workpiece portion, by the back-and-forth movements of the machining tool and the displacement in the longitudinal direction of the rotating shaft according to how the machining unit was programmed.

3. The machining method according to claim 2, wherein during the machining of the ribs or grooves, a change of orientation of the ribs or grooves occurs when passing the halfway point along the first workpiece portion of the first end of the shaft according to how the machining unit was programmed so as to obtain V-shaped grooves over the length of the first workpiece portion in order to generate an air or gas pressure in the front radial bearing disposed on the first workpiece portion during operation of the compressor with the rotation of the shaft above a limit speed so as to no longer have any mechanical contact with the front radial bearing.

4. The machining method according to claim 2, wherein all of the ribs or grooves are obtained at once on a second workpiece portion of the second end of the shaft from the start portion of machining of the second workpiece portion to the end portion of machining of the second workpiece portion, by the back-and-forth movements of the machining tool and the displacement in the longitudinal machining direction of the rotating shaft according to how the machining unit was programmed.

5. The machining method according to claim 1, wherein the workpiece is the shaft and a head of the machining tool is made of diamond, wherein the shaft is driven such that it rotates during machining about the longitudinal axis, in that all of the ribs or grooves are obtained at once on a first workpiece portion of the first end of the shaft from the start portion of machining of the first workpiece portion to the end portion of machining of the first workpiece portion, by the back-and-forth movements of the machining tool and the displacement in the longitudinal direction of the tool holder according to how the machining unit was programmed.

6. The machining method according to claim 5, wherein during the machining of the ribs or grooves, a change of orientation of the ribs or grooves occurs when passing the halfway point along the first workpiece portion of the first end of the shaft according to how the machining unit was programmed so as to obtain V-shaped grooves over the length of the first workpiece portion in order to generate an air or gas pressure in the front radial bearing disposed on the first workpiece portion during operation of the compressor with the rotation of the shaft above a limit speed so as to no longer have any mechanical contact with the front radial bearing.

7. The machining method according to claim 5, wherein all of the ribs or grooves are obtained at once on a second workpiece portion of the second end of the shaft from the start portion of machining of the second workpiece portion to the end portion of machining of the second workpiece portion, by the back-and-forth movements of the machining tool and the displacement in the longitudinal machining direction of the rotating shaft or tool holder according to how the machining unit was programmed.

8. The machining method according to claim 7, wherein during the machining of the ribs or grooves, a change of orientation of the ribs or grooves occurs when passing the halfway point along the second workpiece portion of the second end of the shaft according to how the machining unit was programmed so as to obtain V-shaped grooves over the length of the second machined portion in order to generate an air or gas pressure in the rear radial bearing disposed on the second workpiece portion during operation of the compressor with the rotation of the shaft above a limit speed so as to no longer have any mechanical contact with the rear radial bearing.

9. A method for machining ribs or grooves on a workpiece intended to be rotated about a longitudinal axis of a centrifugal compressor, the workpiece being at least one of a front air or gas radial bearing mounted on a first end of the shaft and a rear air or gas radial bearing mounted on a second end of the shaft, the centrifugal compressor further comprising a shaft made of tungsten carbide or ceramic, on which a rotor structure with at least one permanent magnet of an electric motor is attached in order to drive the shaft such that the shaft rotates, a casing with a fluid inlet and a compressed fluid outlet, a first impeller and a second impeller mounted at two ends of the shaft in the casing, the machining method being carried out in a machining unit adapted to receive the workpiece and comprising a tool holder with a tool for machining the ribs or grooves on at least one portion of the workpiece, wherein all of the ribs or grooves formed on a workpiece portion of the air or gas axial bearing are obtained at once by driving the workpiece such that it rotates by moving the workpiece or the tool holder in a machining direction for extending the grooves via the machining unit, and by moving said machining tool moving back and forth between a machining position in contact with the workpiece and a position wherein it is not in contact with the workpiece from the start to the end of the machining, and wherein, in accordance with a sinusoidal program, the machining unit rotates the workpiece to repeat forward and reverse rotations by continuously and sinusoidally changing the rotation angle of the workpiece while at least synchronising the rotation of the workpiece with the back-and-forth movements of the machining tool so that a determined arrangement of the ribs or grooves are produced on the air or gas axial bearing.

* * * * *